US006234155B1

(12) United States Patent
Brothers et al.

(10) Patent No.: US 6,234,155 B1
(45) Date of Patent: May 22, 2001

(54) ADJUSTABLE TRIGGER SWITCH FOR NITROUS OXIDE INJECTION APPLICATION

(75) Inventors: Paul Brothers, Germantown; William Godbold, Lakeland, both of TN (US); Matthew R. Patrick, Edina, MN (US)

(73) Assignee: Competition Cams, Inc., Memphis, TN (US)

( * ) Notice: Subject to any disclaimer, the term of this patent is extended or adjusted under 35 U.S.C. 154(b) by 0 days.

(21) Appl. No.: 09/404,795

(22) Filed: Sep. 24, 1999

Related U.S. Application Data

(63) Continuation-in-part of application No. 09/325,840, filed on Jun. 4, 1999, which is a continuation of application No. 09/096,342, filed on Jun. 12, 1998, now Pat. No. 5,967,099.

(51) Int. Cl.[7] .................................................... B60T 11/30
(52) U.S. Cl. ............................................................. 123/586
(58) Field of Search ..................................... 123/585, 586

(56) References Cited

U.S. PATENT DOCUMENTS 3,789,816 * 2/1974 Taplin et al. .......................... 123/436
4,376,485 * 3/1983 Shah ...................................... 209/575

OTHER PUBLICATIONS

Paul Horowith et al., The Art of Electronics, Second Edition, 1989, pp. 64, 229–232.

* cited by examiner

Primary Examiner—Noah P. Kamen
(74) Attorney, Agent, or Firm—Wilburn L. Chesser, Esq.; Piper Marbury Rudnick & Wolfe LLP

(57) ABSTRACT

A low power or current draw adjustable trigger switch and method and system for using the adjustable trigger switch in conjunction with a triggered accessory for an internal combustion engine, such as a feed from a source of compressed oxygen enhancer, such as nitrous oxide. The adjustable trigger switch, in operation in conjunction with the triggered accessory, allows selective activation of the accessory to, for example, improve engine performance. In one application, the triggering occurs via an engine electrical output, such as a throttle position sensor (TPS) voltage. The trigger, which includes, for example, an operational amplifier circuit, logic gates, or a series of transistors (e.g., a Schmitt trigger), operated in conjunction with a user variable setting, such as a potentiometer, and an indicator for proper setting, such as a light emitting diode (LED), allows variable tailoring of the trigger to the sensed output at a selected output setting without incurring significant power or current draw from the sensed output. Another aspect of the invention is use of a low power or current draw switch, such as a metal-oxide-semiconductor field-effect transistor (MOSFET) that further allows triggered accessory operation at high power or current draw without producing high power or current through the sensing circuit itself.

28 Claims, 5 Drawing Sheets

ADJUSTABLE TRIGGER SWITCH FOR NITROUS OXIDE INJECTION APPLICATION

This application is a continuation-in-part of applicant's U.S. patent application Ser. No. 09/325,840 titled "SYSTEM, METHOD, AND DEVICE FOR NITROUS OXIDE INJECTION" filed Jun. 4, 1999, which is a continuation of U.S. patent application Ser. No. 09/096,342 titled "SYSTEM, METHOD, AND DEVICE FOR NITROUS OXIDE INJECTION" filed Jun. 12, 1998 now U.S. Pat. No. 5,967,099.

FIELD OF THE INVENTION

This invention relates to an adjustable trigger switch for use in conjunction with an accessory for an internal combustion engine, and in particular to an adjustable trigger switch for triggering nitrous oxide flow or other accelerator or other engine related variable output triggered accessory for an internal combustion engine.

BACKGROUND

Some accessories for internal combustion engines, especially such accessories as nitrous oxide injection systems and other engine performance enhancing devices, typically require triggering or operation of these systems only at certain engine speeds or fuel feed conditions, such as at full throttle. It is known in the art to provide triggering via mechanical attachments, such as mechanical attachment of a switch or other activation device to a throttle lever or accelerator pedal.

Many modern cars also provide for control of various engine and other functions using computer and electronic systems and devices. These systems typically include various sensing or output connections for providing such output as variable voltages or currents corresponding to driven functions.

One problem with using such outputs as the throttle position sensor (TPS) for an internal combustion engined vehicle or other sensed voltage locations for vehicles is that such locations are typically sensitive to current loading. For example, the TPS has an output voltage that reflects the voltage of the system used to control vehicle engine operation, which occurs through relatively sensitive electronic and computer control components. As a result, placing a high load, such as a low resistance resistor or other component, between the TPS and ground may cause a high current draw from this voltage source, potentially affecting computer or other circuit operation by reducing effective current or voltage available to those components. In addition, depending on the particular computer or circuit layout for the engine, it is possible that the high current may be drawn through the computer or circuit for the engine, potentially producing a failure of those components.

Further, by altering the current or voltage level available to the computer or other circuit for the engine, other engine components or engine performance may be significantly altered, producing such unwanted results as overrevving of the engine or producing an engine speed much below the expected speed for a given output voltage, potentially resulting in engine damage or failure.

Another problem with using such output as the sensed TPS voltage for triggering, for example, a nitrous oxide system is that variation exists between car models in the output voltage at the TPS for full throttle. Typically, in an application such as a trigger for a nitrous oxide kit, nitrous oxide must be fed via a switch mechanism only at full throttle conditions. However, some cars have full throttle at a high voltage condition, while others have full throttle at a low voltage. For example, in some cars, throttle position sensor voltage varies from a low of about 0 volts at idle to about 5 volts at full throttle, while other cars have an idle voltage of 5 volts with a full throttle voltage of 0 volts. Further, the range of voltage levels is variable. The high voltage may be 4 volts, 5 volts, 6 volts, or 10 volts, for example.

Accordingly, there is a need for a simple, reliable, and relatively current insensitive device, method, and system for allowing simple installation and trigger setting for an engine performance accessory item, such as a nitrous oxide injection system. There is a further need for a device, method, and system that allows flexible setting for both high and low voltage full throttle conditions and for a range of voltages or other electrical output at full throttle or at other selected engine conditions. There is a further need for such a device, method, and system that requires little current or power draw from the sensed source for the trigger. There is yet a further need for a device, method, and system that is easily installed and adjusted by a single user.

SUMMARY OF THE INVENTION

It is an advantage of the present invention to meet these needs, and others, by providing an adjustable trigger switch that is usable in conjunction with a range of engine system outputs and requires a low current or power draw.

It is a further advantage of the present invention to provide an adjustable trigger switch that utilizes a voltage or other electrical output comparison device. It is another advantage of the present invention to provide an adjustable trigger switch that incorporates an operational amplifier. It is another advantage of the present invention to provide an adjustable trigger switch that incorporates at least one logic gate. It is yet another advantage of the present invention to provide an adjustable trigger switch that incorporates a series of transistors. It is a further advantage of the present invention to provide an adjustable trigger switch that incorporates a Schmitt trigger.

It is a further advantage of the present invention to provide an adjustable trigger switch that is adjustable to both high and low voltage conditions and to a range of voltages.

It is yet a further advantage of the present invention to provide an adjustable trigger device that is easily installed and adjusted by the user.

The present invention includes a low current or power draw adjustable trigger switch and method and system for using the adjustable trigger switch in conjunction with a triggered accessory for an internal combustion engine, such as an accelerator output triggered feed from a source of compressed oxygen enhancer, such as nitrous oxide. The adjustable trigger switch of the present invention is not intended to be limited to the nitrous oxide injection application disclosed, but is usable with other devices or systems for use with internal combustion engines that are capable of utilizing variably set trigger points, nor is it intended to be limited to use of an accelerator output as the variable trigger reference.

The adjustable trigger switch, in operation in conjunction with the triggered accessory, allows selective activation of the accessory to, for example, improve engine performance. In an embodiment of the present invention, the triggering occurs via an engine electrical output, such as a TPS. The trigger, which includes, for example, an operational amplifier circuit, logic gates, or a series of transistors (e.g., a Schmitt trigger) operated in conjunction with a user variable setting, such as a potentiometer, and an indicator for proper setting, such as a light emitting diode (LED), allows variable tailoring of the trigger to the sensed output at a selected output setting without incurring significant power or current draw from the sensed output. Another aspect of an embodiment of the present invention is use of a low power or current draw switch, such as a metal-oxide-semiconductor field-effect transistor (MOSFET) that further allows triggered accessory operation at high current draw without producing high current through the sensing circuit.

One embodiment of the present invention is particularly designed for use in conjunction with the nitrous oxide fuel injection kit that is the subject of applicant's copending U.S. patent application Ser. No. 09/096,342 titled "SYSTEM, METHOD AND DEVICE FOR NITROUS OXIDE INJECTION" filed Jun. 12, 1998, and continuation thereof, U.S. patent application Ser. No. 09/325,840 filed Jun. 4, 1999, both of which are hereby incorporated by reference. The present invention is not intended to be limited to use with the nitrous oxide fuel injector kit of applicant's prior application.

To achieve the stated and other advantages of the present invention, as embodied and described below, the invention includes an adjustable trigger switch for use with a switch activated accessory for an internal combustion engine, the engine having a variable electrical output, wherein the variable electrical output includes a set point output, the adjustable trigger switch comprising: an input for connection to the set point output; a comparator connected to the input for comparing the set point output to a variable electrical reference, wherein the comparator provides a comparator output upon the variable reference output approximately equaling the set point output; and an output connection for coupling the comparator output to the switch activated accessory; wherein the variable electrical reference is varied until the voltage comparator provides the comparator output, such that the variable electrical reference is set to a variable reference trigger point, and wherein the variable electrical output of the internal combustion engine variably triggers the adjustable trigger switch at the variable reference trigger point.

To achieve the stated and other advantages of the present invention, as embodied and described below, the invention further includes a method for setting an adjustable trigger for a nitrous oxide feed for an internal combustion engine, wherein the engine has a throttle position sensor, wherein the throttle position sensor has an electrical output varying with throttle position, the throttle position having a selected trigger position, and the selected trigger position having a corresponding trigger electrical output, the adjustable trigger including a comparator connected to the throttle position sensor, wherein the comparator includes a variable electrical reference, the method comprising: receiving the trigger electrical output; receiving a variation in the variable electrical reference; comparing the trigger electrical output to the varied electrical reference; and transmitting an output signal upon the varied electrical reference reaching a predetermined value relative to the trigger electrical output.

Additional advantages and novel features of the invention will be set forth in part in the description that follows, and in part will become more apparent to those skilled in the art upon examination of the following or upon learning by practice of the invention.

DETAILED DESCRIPTION

An embodiment of the present invention uses an electronic, digital, or logic gated system, such as a system incorporating an operational amplifier (op amp), logic gates, or a series of transistors, such as a Schmitt trigger, to variably adjust the throttle position sensor trigger point or other sensed engine electrical output to trigger an engine accessory, such as a feed of nitrous oxide from a pressurized source. The trigger is also useable in conjunction with other engine accessory operation. One embodiment of the present invention is particularly designed for use in conjunction with applicant's nitrous oxide fuel injection kit.

References will now be made in detail to an embodiment of the present invention, an example of which is illustrated in the accompanying drawings.

Figure 1:
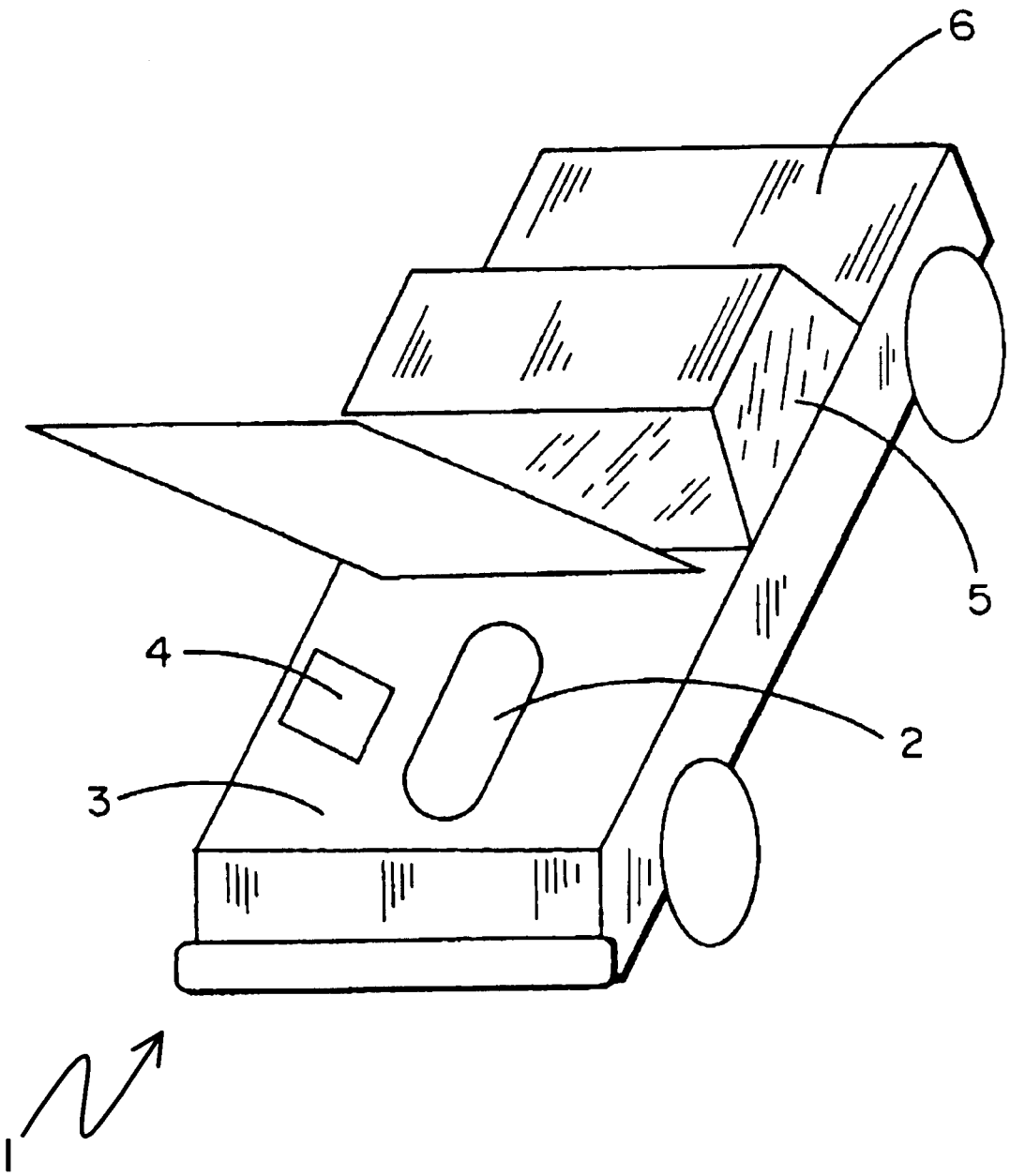
FIG. 1 presents a vehicle having an engine and oxygen enhancer feed system for use with an adjustable trigger switch in accordance with an embodiment of the present invention.

FIG. 1 presents an overview of the components of the variable trigger switch and a driven accessory, such as a nitrous oxide injection system for an example vehicle, in accordance with an embodiment of the present invention. FIG. 1 presents a vehicle 1, such as an automobile having an engine 2, an engine compartment 3 with an oxygen enhancement device component unit 4, such as a component unit for a nitrous oxide injection device, which is primarily installed in the engine compartment 3, a passenger compartment 5, and a trunk compartment 6, in accordance with an embodiment of the present invention, for use with an adjustable trigger switch.

Figure 2:
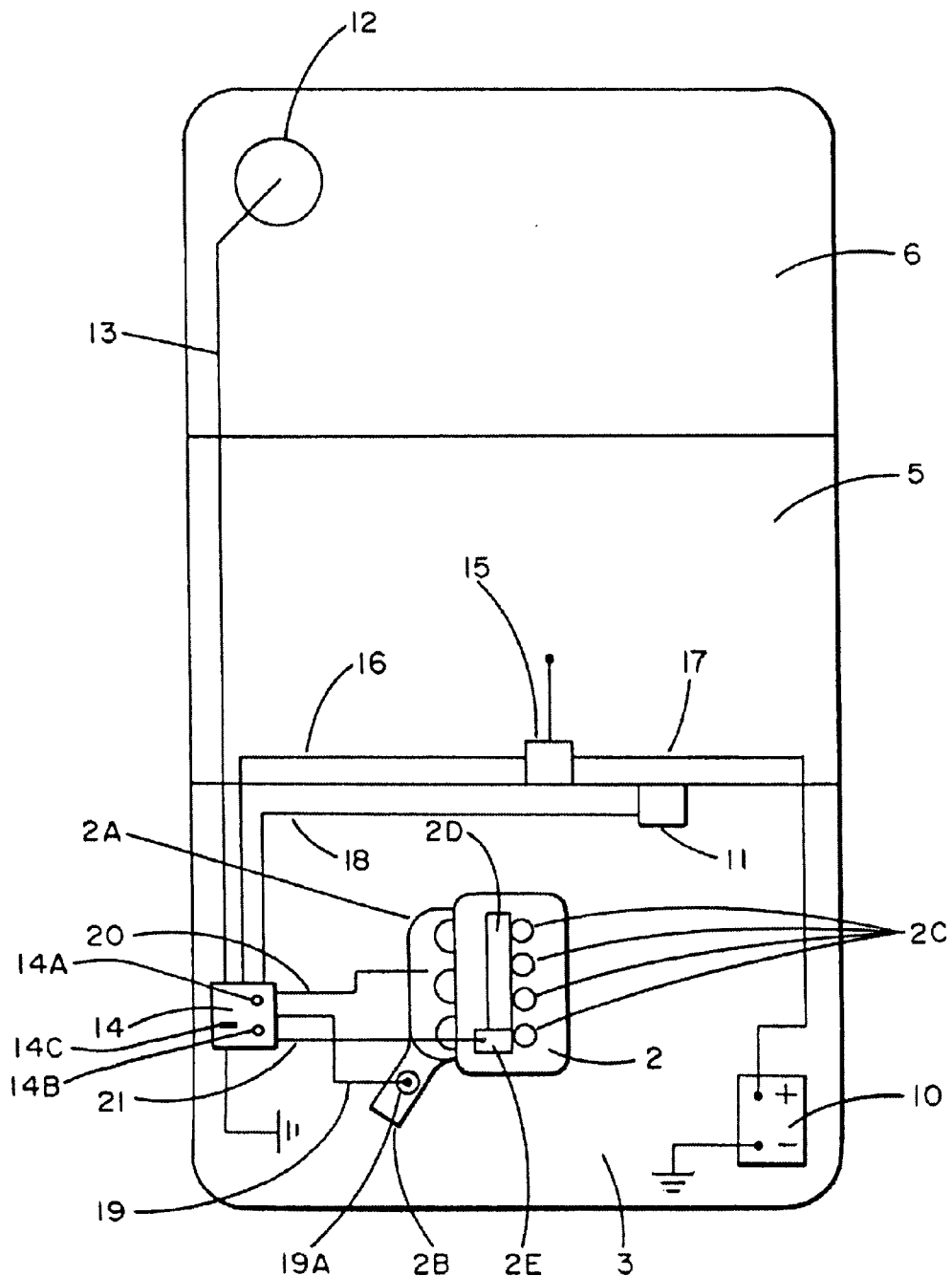
FIG. 2 depicts an overview diagram of an internal combustion engine within a vehicle, the engine having an oxygen enhancer feed and an adjustable trigger switch in accordance with an embodiment of the present invention.

FIG. 2 contains an overhead view of the installation location of an adjustable trigger switch for use with an oxygen enhancement device in accordance with an embodiment of the present invention, as installed in a typical vehicle 1. As shown in FIG. 2, the vehicle 1 includes an engine 2 having combustion chambers, with an engine intake manifold 2a and an engine feed location 2b in accordance with an embodiment of the present invention, installed within the air intake tube or conduit for the engine 2, leading to, for example, the fuel injectors 2c on a fuel rail 2d, and having a fuel regulator 2e, which is pressure actuated, connected to the fuel rail 2d. The engine compartment 3 further includes a battery 10 and an accelerator position indicator 11, such as a TPS for use in conjunction with the adjustable trigger switch used in accordance with an embodiment of the present invention.

In accordance with the oxygen enhancer device for use with an embodiment of the present invention, elements of the oxygen enhancer device are contained in various vehicle compartments. An embodiment of the present invention includes a source of an oxygen enhancer 12, such as a tank of compressed nitrous oxide or other readily usable source of oxygen that may be stored in a compressed form, contained in the trunk compartment 6. The source of an oxygen enhancer 12 is connected by a conduit 13, such as a hose or other line, to a components unit 14, which also houses a portion of the components of the adjustable trigger switch circuit of an embodiment of the present invention.

In an embodiment of the present invention, the components of the components unit 14 for use with the oxygen enhancer feed system include a solenoid switch, a throttle switch, such as an electronic throttle switch, and an oxygen enhancer manifold with a pressure release vent, such as a fuel pressure jet. In accordance with an embodiment of the present invention, also included with the components unit 14 are a variable setting input 14a, such as a potentiometer, an indicator 14b, such as an LED, and an inverter switch 14c for inverting the adjustable trigger switch device.

In an embodiment of the present invention, a switch 15 is coupled 16, by, for example, electrical connecting wires, to the components unit 14. The battery 10 is also coupled 17, by, for example, electrical connecting wires, to the combination unit 14 to provide an electrical power source for the device. The combination unit 14 is further coupled 18, by, for example, electrical connecting wires, to the accelerator position indicator 11, such as the TPS.

As further shown in FIG. 2, attached to the combination unit 14 is a feed conduit 19, such as a hose, for connection to an engine feed location 2b. The connection 19a is positioned so as to direct a feed of oxygen enhancer that is transmitted from the source of the oxygen enhancer 12 via pressure through the component unit 14 into the feed location 2b. The feed location 2b, in turn, is positioned so as to feed air and the transmitted oxygen enhancer into the combustion chambers of the engine 2. Connected to the component unit 14 is a vent conduit 20, which connects the pressure release valve and a vent to the engine intake manifold 2a.

As further shown in FIG. 2, connecting the fuel regulator 2e and the component unit 14 is a fuel regulator conduit 21. This conduit 21 transmits pressure to the fuel regulator 2e, such that fuel flow to the fuel rail 2d and hence to the fuel injectors 2c is affected by the pressure. In an embodiment of the present invention, pressure to the fuel regulator 2e varies with changes in the pressure of the oxygen enhancer transmitted into the feed location 2b.

Figure 3:
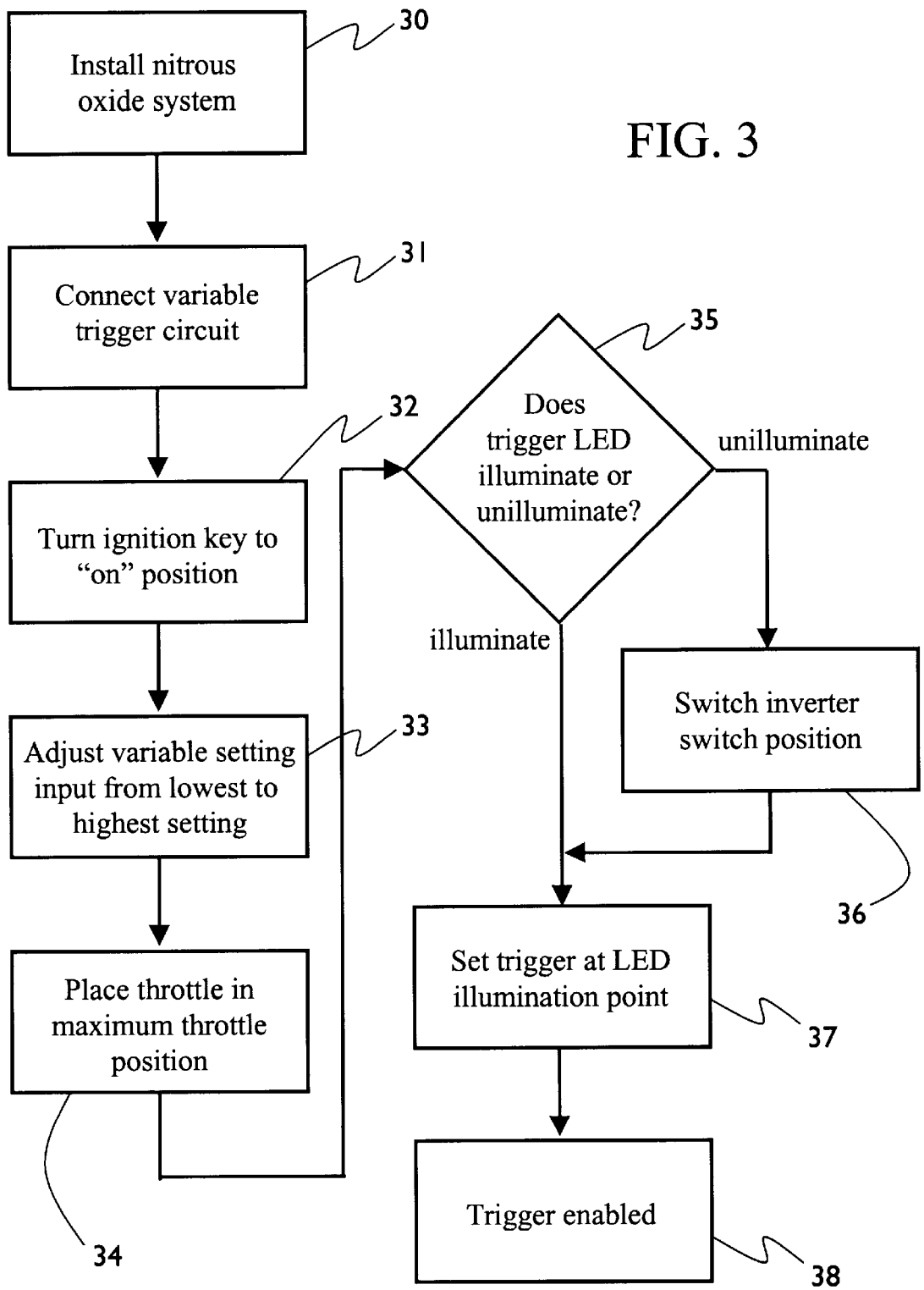
FIG. 3 presents a flow diagram of the functional operation of the adjustable trigger switch of an embodiment of the present invention.

FIG. 3 presents a flow diagram of the functional operation of the adjustable trigger switch of an embodiment of the present invention. In FIG. 3, the accessory system, such as a nitrous oxide system, is installed 30 for an engine, such as a vehicle engine. The variable trigger circuit, such as a circuit containing an op amp, is connected 31, to a trigger sensor, such as the TPS. The ignition key for the vehicle or other engine switch is turned to the "on" position 32. In addition, any other triggering mechanisms for the accessory are disabled (for example, for a nitrous oxide system, the bottle feed valve is closed so that no nitrous oxide is feedable during the adjustment). For this example application, the throttle is then moved to the maximum throttle position 33. The variable setting input, such as a potentiometer, is then adjusted from a low position to a high position 34, while an indicator, such as an LED is observed. In 35, it is determined whether the indicator changes from "on" to "off," such as an LED changing from an illuminated to unilluminated state during the adjustment of the variable setting input from the low to high position. In 36, if the indicator changed from "on" to "off," the inverter switch is switched from its set position to an inverting position. For the indicator changing from "off" to "on," the variable setting input is then set 37 at just above the "on" position.

The properly set variable setting input then enables 38 the adjustable trigger for triggering at, for example, the predetermined voltage. For example, for a vehicle having an installed nitrous oxide system that is triggered at full throttle, as sensed by voltage output at the TPS, upon return of the throttle to an unaccelerated position, the nitrous bottle valve is opened to enable feed. The vehicle is then started and nitrous feed occurs via the nitrous feed system upon full throttle being applied.

Figure 4:
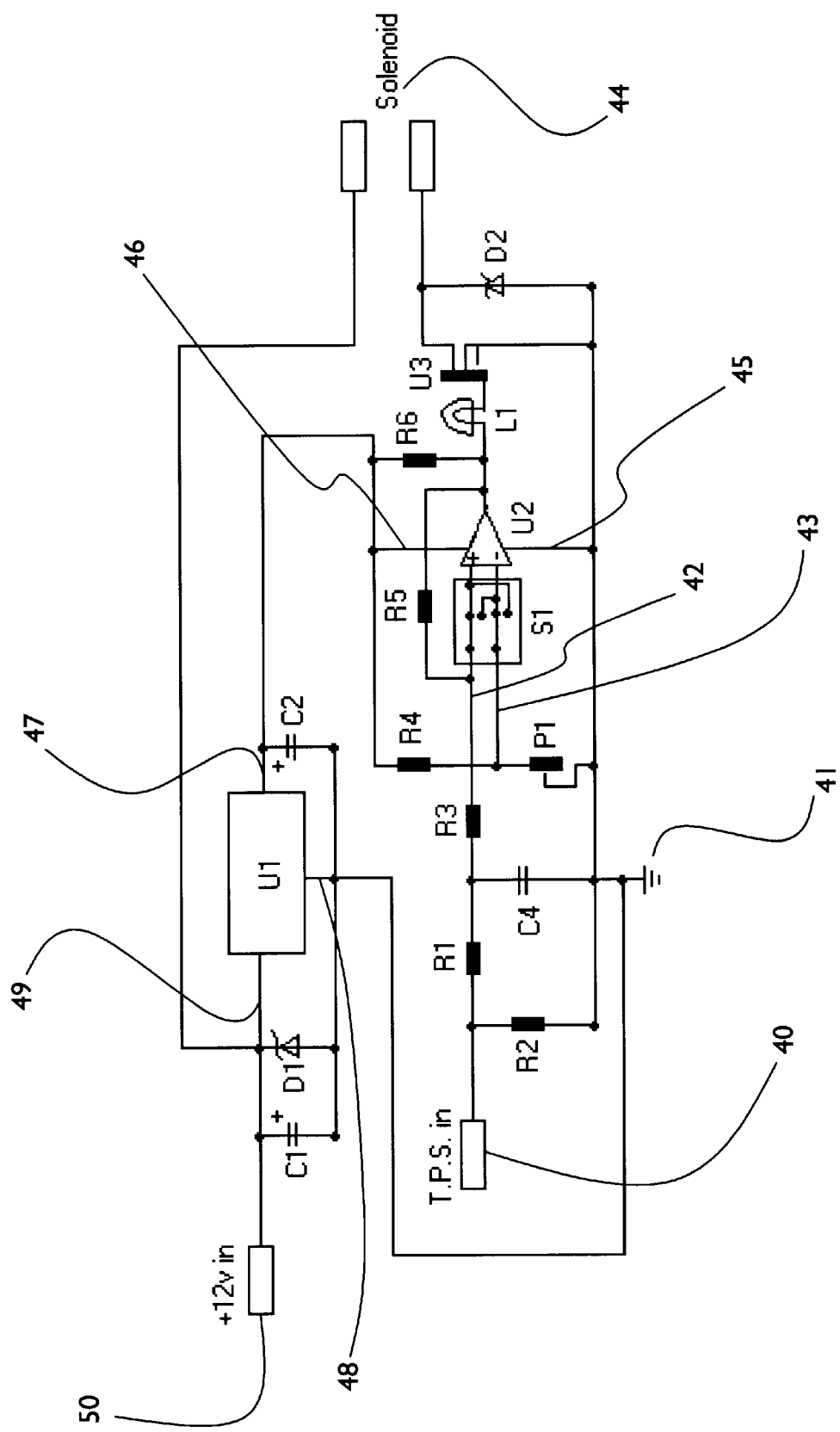
FIG. 4 shows an example circuit diagram of a trigger circuit incorporating an operational amplifier in accordance with an embodiment of the present invention.

A number of electrical or electronic triggers, such as op amps, logic gates, or a series of transistors and other electronic components, including, for example, a Schmitt trigger, may be suitably adapted as further described below for use as an adjustable trigger in accordance with the present invention. For illustration purposes, one embodiment of the present invention will now be described, comprising an op amp circuit and other components, including a potentiometer for varying the set point, an indicator LED, and a metal-oxide-semiconductor field-effect transistor (MOSFET), as shown in FIG. 4. The adjustable trigger circuit of FIG. 4 is therefore understood to be only one example of a circuit usable in accordance with the method and system of the present invention.

As shown in FIG. 4, in this embodiment, the TPS 40, is connected to a low pass filter, which includes a first resistor R1 and a capacitor C4, located between R1 and ground 41. The resistor R1 in turn is connected via a second resistor R2 to ground 41 and via a third resistor R3 to a first lead 42 for a switch S1. The switch S1, such as a double pole, double throw switch, is connected to the positive and negative leads of an op amp U2. A second lead 43 for the switch S1 is connected to a potentiometer P1, which in turn is connected to ground 41. The switch S1 allows the op amp to function in an inverted manner in a first position and in a noninverted manner in a second position.

The output from the op amp U2 is connected via an indicator L1, such as an LED, to MOSFET U3, which is used as a switch for a solenoid 43, serving to activate the triggered accessory, such as a nitrous oxide system. In parallel with the MOSFET U3 is a diode D2 oriented to prevent inductive feedback from the solenoid 41. Also connected between the output of the MOSFET U3 and the resistor R3 is another resistor R5.

A first power supply connection 45 for the op amp U2 is connected to ground 41, and a second power supply connection 46 is connected to an output 47 of a voltage regulator U1. The second power supply connection 46 is also connected to a resistor R4, which in turn is connected to the potentiometer P1 and the second switch lead 43.

As further shown in FIG. 4, a power supply U1, such as a three lead power regulator, is connected at its output 47 to the first power supply connection 46 of the op amp U2, allowing a constant voltage, such as 5 volts dc, to be applied to the op amp U2. The voltage regulator U1 is also connected to ground 41 at a second lead 48, and the input 49 is connected to a power source 50, such as a vehicle 12-volt battery positive lead. The input 49 and power supply 50 are also connected to the solenoid 44. A capacitor C1 is connected between the input 49 of the power supply U1 and ground 41, and another capacitor C2 is connected between the output 47 of the voltage regulator U1 and ground 41, to remove noise from the voltage regulator circuit. A diode D1 is also placed between the solenoid 44 at the input 49 of the voltage regulator U1 and ground 41, oriented to prevent inductive feedback from the solenoid 44.

In this embodiment, the resisters R4, R5, R6 and the potentiometer P1 function with the op amp U2 to serve as a voltage comparator. The resistor R4 and the potentiometer P1 serve as a voltage divider, varying the voltage input 43 fed to the op amp U2. The potentiometer P1 allows trimming of the voltage divider up and down in the voltage comparator circuit, which, in turn, varies the voltage at which the op amp U2 switches on and off, tailoring the trigger to the voltage supplied by the TPS 40.

Functionally, L1, such as an LED, provides indication as to when the potentiometer or other adjusting feature for setting the trigger voltage is reached. To set the trigger, in an embodiment of the present invention for use with a nitrous oxide kit, after connecting the device, the nitrous oxide bottle valve is first closed. Then, the car ignition is turned to the on position, but the car is not started. From underneath the hood, the throttle is then opened by hand, and the potentiometer P1 or other adjusting feature is adjusted until the LED illuminates.

In an embodiment of the present invention, the LED and the potentiometer, as well as the other circuit components of the present invention are located within a component unit for the triggered device, such as a nitrous oxide kit, except for the solenoid switch for the triggered device, which is located at a physical trigger point outside the component unit, such as at the nitrous oxide bottle valve.

Thus, one aspect of the present invention is ease of use in setting the variable trigger. A user uses one hand to hold the throttle open and with the other hand uses a screwdriver to turn a potentiometer or other adjusting feature until the LED illuminates, indicating that the trigger has been properly set. In addition, the system allows the user to determine the voltage operational direction of the throttle position sensor. If the LED is unilluminated at a lower potentiometer setting, for example, then illuminates at a higher setting, the user is assured that the op amp or other trigger has a correct orientation. If, however, the LED illuminates at a lower setting and then becomes unilluminated at a higher setting, the user has indication that the op amp should be inverted from its current setting. An embodiment of the present invention includes an inverter switch for inverting the op amp, for example, to allow correct setting of the trigger.

In an embodiment of the present invention, the voltage comparator system of the present invention includes a trigger enabling component, such as a MOSFET, which prevents operation of the system absent the setting of the circuit such that the LED or other indicator is illuminated. The purpose of the trigger enabling component of an embodiment of the present invention is to provide an enabling switch for operation of the circuit through the solenoid or other switch, which typically carries a high current, and which, if otherwise directly operated through the comparator circuit of the present invention, could damage components. Similarly, a diode (see D1 in FIG. 4) is included in the example for this embodiment to prevent the inductive load of the solenoid, for example, from discharging through the MOSFET, potentially causing damage to the components. This diode is referred to as a suppression diode.

One aspects of the various embodiments of the present invention is that they each are designed to ensure that the current draw from the TPS is minimal, in order to prevent interference or damage to the vehicle computer or other electrical or electronic components, as well as to prevent resulting damage to the engine or interference with vehicle system operation. In an embodiment of the present invention, the op amp or a logic gate, for example, amplify or sense voltage without drawing significant current, and feed a triggered switch, such as a MOSFET to accomplish this function.

Figure 5:
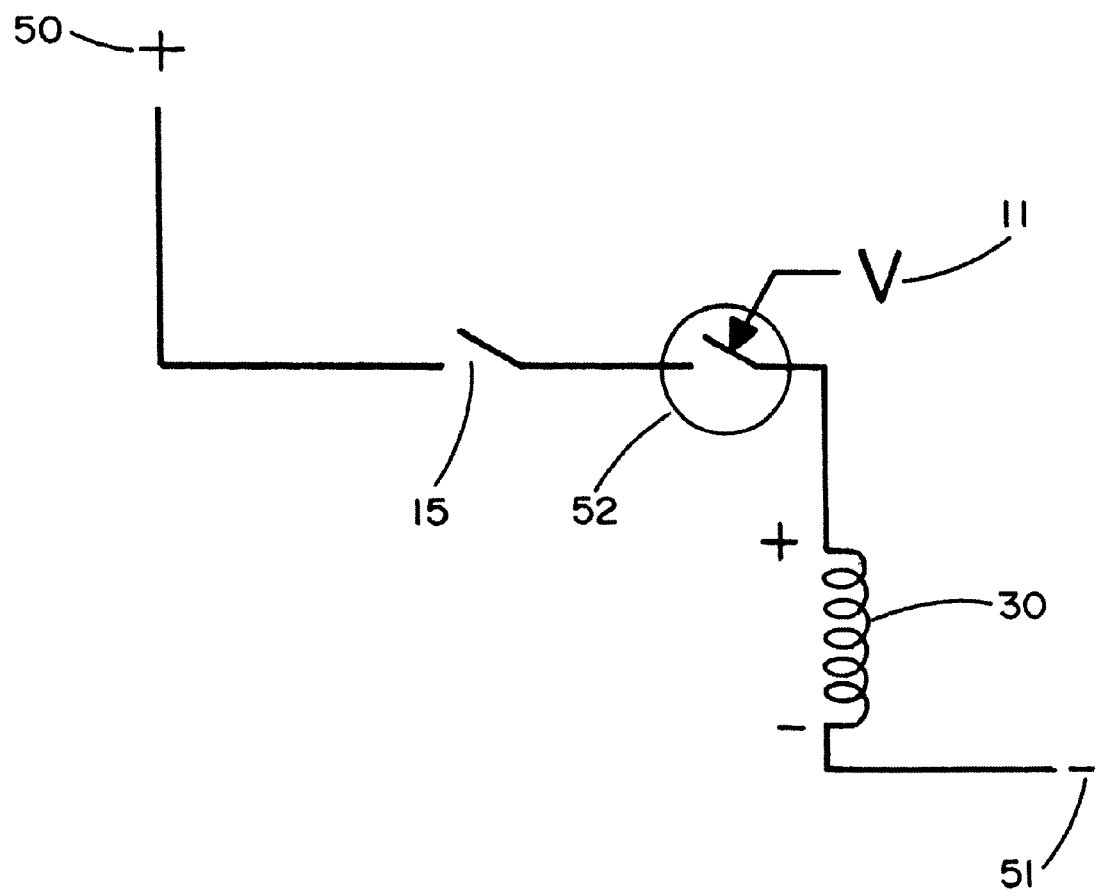
FIG. 5 is an overview diagram of the circuit of a triggered device and triggering features in accordance with an embodiment of the present invention.

FIG. 5 shows a wiring diagram for the electrical components of a triggered device and trigger in accordance with an embodiment of the present invention. As shown in FIG. 5, the electrical portion of the system includes a positive battery terminal connection 50 and a negative battery terminal connection 51. The circuit includes an enabling switch 15, also known as an arming switch, connected to the positive battery terminal connection 50. The enabling switch 15 is also connected to a trigger switch 52, such as an electronic throttle switch. The enabling switch 15 prevents operation of the system unless it is in the closed position. The trigger switch 52 is connected to the accelerator feed 11, such that the trigger switch 52 closes upon the accelerator feed 11 reaching the triggering point, such as a triggering voltage, as when the accelerator is in the full throttle position. The closing of the trigger switch 52 at the triggering voltage may be accomplished in a number of ways, such as through the use of a transistor. The trigger switch 52 thus prevents operation of the system except when the accelerator is in the full throttle position. The trigger switch 52 is also connected to an inductor controlled switch 30, such as a solenoid. The solenoid 30 is connected to the negative battery terminal connection 51. When the enabling switch 15 is closed and the trigger switch 52 is triggered, the circuit is complete and the solenoid 30 operates. The solenoid 30 in turn opens a valve, for example, producing feed of oxygen enhancer to the engine and to the oxygen enhancer manifold.

Embodiments of the present invention have now been described. It will be appreciated that these examples are merely illustrative of the invention. Many variations and modifications will be apparent to those skilled in the art.

What is claimed is:

1. An adjustable trigger switch for use in combination with a switch activated accessory and an internal combustion engine, the adjustable trigger switch in combination with the switch activated accessory and the internal combustion engine comprising:

the internal combustion engine, the engine having a variable electrical output, wherein the variable electrical output includes a set point output;

the switch activated accessory; and the adjustable trigger switch, the adjustable trigger switch including:

an input for connection to the set point output;

a comparator connected to the input for comparing the set point output to a variable electrical reference, wherein the comparator provides a comparator output upon the variable reference output approximately equaling the set point output; and an output connection for coupling the comparator output to the switch activated accessory;

wherein the variable electrical reference is varied until the comparator provides the comparator output, such that the variable electrical reference is set to a variable reference trigger point, and wherein the variable electrical output of the internal combustion engine is enabled to variably trigger the adjustable trigger switch at the variable reference trigger point.

2. The adjustable trigger switch of claim 1, wherein the engine has a throttle position sensor, and wherein the variable electrical output is a variable output voltage for the throttle position sensor.

3. The adjustable trigger switch of claim 2, wherein the engine has a variable engine fuel feed, the variable output voltage of the throttle position sensor varying with the engine fuel feed, and wherein the set point output is a voltage output for the throttle position sensor for a selected engine fuel feed.

4. The adjustable trigger switch of claim 3, wherein the variable electrical reference comprises a potentiometer.

5. The adjustable trigger switch of claim 1, wherein the comparator comprises an operational amplifier.

6. The adjustable trigger switch of claim 1, wherein the comparator comprises at least one logic gate.

7. The adjustable trigger switch of claim 1, wherein the comparator comprises at least one transistor.

8. The adjustable trigger switch of claim 1, wherein the comparator includes a metal-oxide-semiconductor field-effect transistor.

9. The adjustable trigger switch of claim 8, wherein the switch activated accessory is activated by the metal-oxide-semiconductor field-effect transistor.

10. The adjustable trigger switch of claim 1, wherein the switch activated accessory is a nitrous oxide feed system.

11. The adjustable trigger switch of claim 1, wherein the switch activated accessory comprises a solenoid.

12. The adjustable trigger switch of claim 1, further comprising a voltage regulator for supplying a constant voltage.

13. The adjustable trigger switch of claim 3, wherein the engine has a throttle for varying engine fuel feed, and wherein the selected engine fuel feed is full throttle.

14. The adjustable trigger switch of claim 13, wherein the variable output voltage has a directional voltage variation with the engine fuel feed, the directional voltage variation selected from a group consisting of a first variation from a high voltage at an engine idle to a low voltage at the full throttle, and a second variation from the high voltage at the full throttle to the low voltage at the engine idle, the adjustable trigger switch further comprising:

an inverter switch for inverting the comparator depending on the directional voltage variation.

15. The adjustable trigger switch of claim 1, further comprising a light emitting diode for indicating when the voltage comparator provides the comparator output.

16. A method for setting an adjustable trigger for a nitrous oxide feed for an internal combustion engine having an engine accessory triggerable by a received electrical input, wherein the engine has a throttle position sensor, wherein the throttle position sensor has an electrical output varying with throttle position, the throttle position having a selected trigger position, and the selected trigger position having a corresponding trigger electrical output, the adjustable trigger including a comparator connected to the throttle position sensor, wherein the comparator includes a variable electrical voltage, the adjustable trigger further including an electrical output connectable to the engine accessory as the received electrical input wherein occurrence of the electrical output varies with variation in the variable electrical voltage, the method comprising:

receiving the trigger electrical output;

receiving a variation in the variable electrical voltage; and setting the variable electrical voltage, wherein the variable electrical voltage is set such that the electrical output is transmitted, transmission occurring upon the varied electrical voltage reaching a predetermined value relative to the trigger electrical output.

17. The method of claim 16, wherein the transmitted output signal produces a current.

18. The method of claim 17, wherein the current illuminates a light emitting diode.

19. A throttle position sensor for controlling an oxygen enhancer feed to an internal combustion engine for a vehicle, the throttle position sensor in combination with the internal combustion engine comprising:

the internal combustion engine for the vehicle, the internal combustion engine having an accelerator output, wherein the accelerator output increases with increased acceleration of the internal combustion engine;

a source for the oxygen enhancer feed, the source been connected to the internal combustion engine;

a variable switch coupled to the accelerator output, the variable switch completing a circuit upon the accelerator output increasing to a predetermined output level; and an inductor coupled to the variable switch for inducing a magnetic field, such that a magnetic switch is triggerable by the induced magnetic field;

wherein the triggered magnetic switch produces the oxygen enhancer feed to the internal combustion engine.

20. The throttle position sensor of claim 19, wherein the variable switch comprises a transistor.

21. The throttle position sensor of claim 19, wherein the inductor and the magnetic switch comprise a solenoid switch.

22. The throttle position sensor of claim 19, wherein the vehicle comprises a power source having a first lead and a second lead, the throttle position sensor further comprising:

a first connector for coupling the variable switch to the first lead of the power source; and a second connector for coupling the inductor to the second lead of the power source.

23. The throttle position sensor of claim 22, wherein the power source comprises a battery.

24. The throttle position sensor of claim 19, further comprising an enabling switch, the enabling switch for enabling and disabling the throttle position sensor.

25. The throttle position sensor of claim 19, wherein the oxygen enhancer comprises nitrous oxide.

26. A throttle position sensing circuit for a nitrous oxide device for a vehicle having an internal combustion engine, the circuit in combination with the internal combustion engine comprising:

a source for a feed of nitrous oxide;

the internal combustion engine, the internal combustion engine being capable of receiving the feed of nitrous oxide, and the internal combustion engine having a battery with a first lead and a second lead, and an accelerator voltage output wherein the accelerator voltage output varies with varying acceleration of the internal combustion engine;

a variable voltage triggered switch coupled to the first lead and coupled to the accelerator voltage output, the variable voltage triggered switch being triggered by the accelerator voltage output reaching a predetermined voltage; and a solenoid switch coupled to the variable voltage triggered switch and coupled to the second lead of the battery;

wherein the completion of the throttle position sensing circuit activates the solenoid switch, and wherein the activated solenoid switch opens a valve, the opened valve allowing the nitrous oxide feed to the internal combustion engine.

27. The throttle position sensing circuit of claim 26, wherein the variable voltage triggered switch comprises a transistor.

28. The throttle position sensing circuit of claim 26, further comprising an enabling switch.

* * * * *